UNITED STATES PATENT OFFICE.

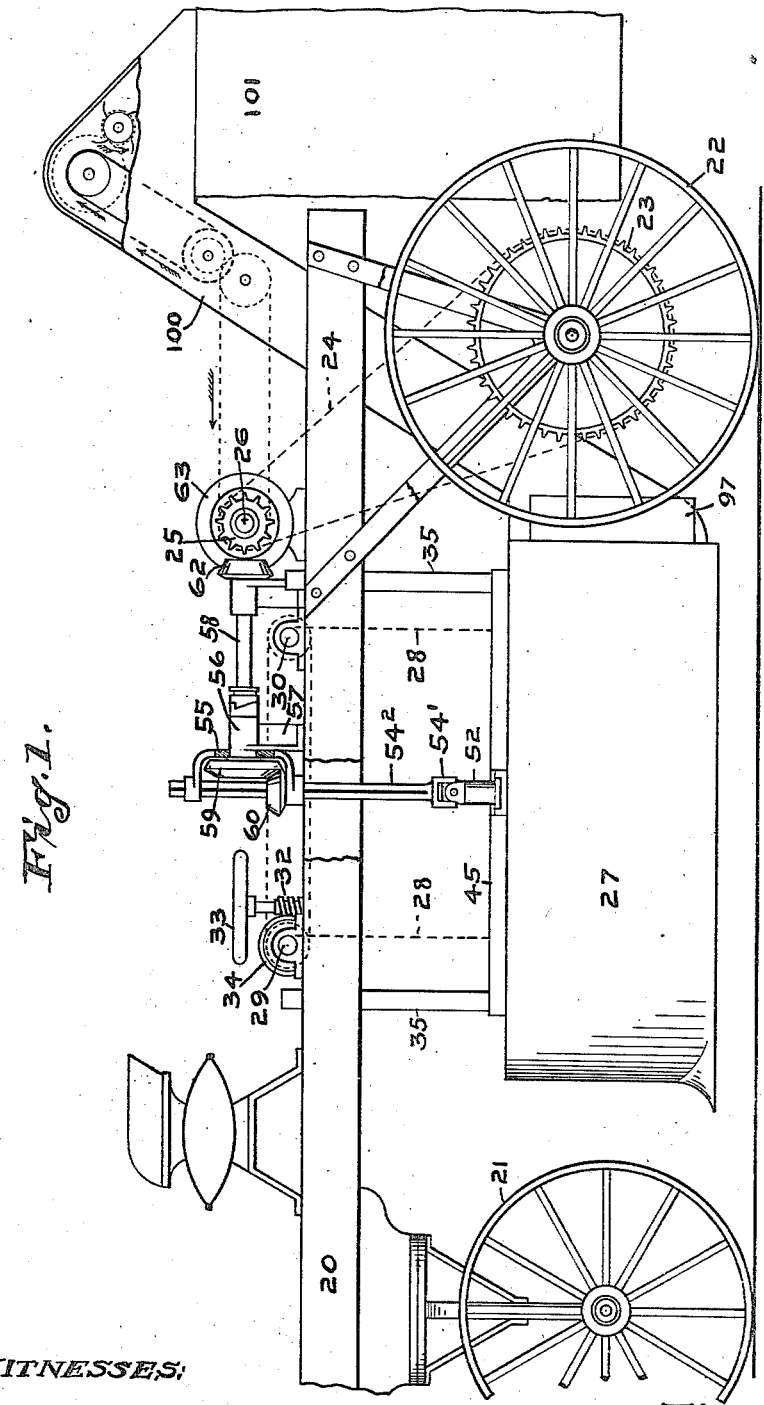

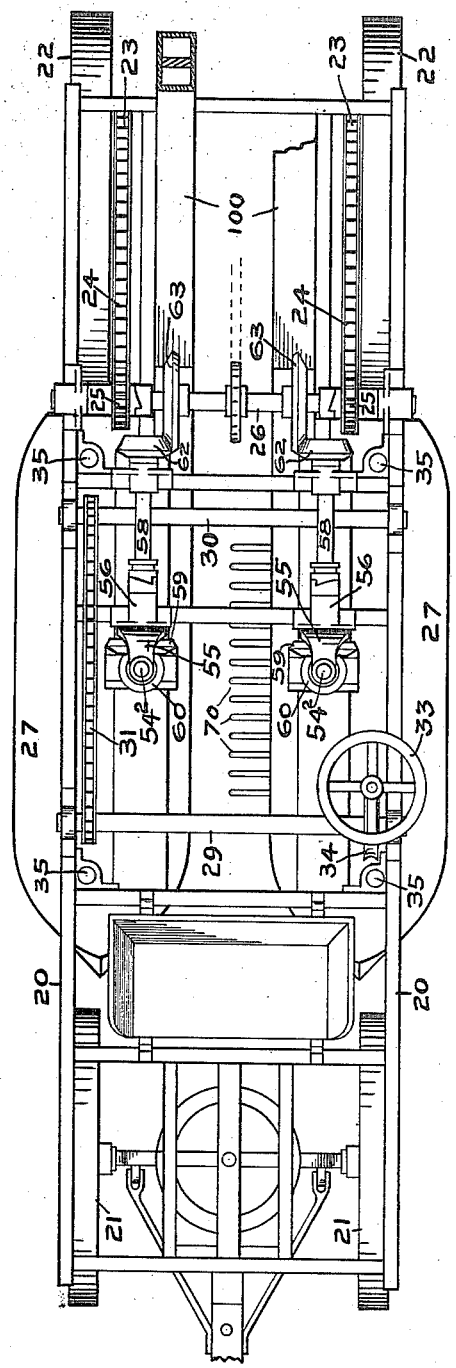

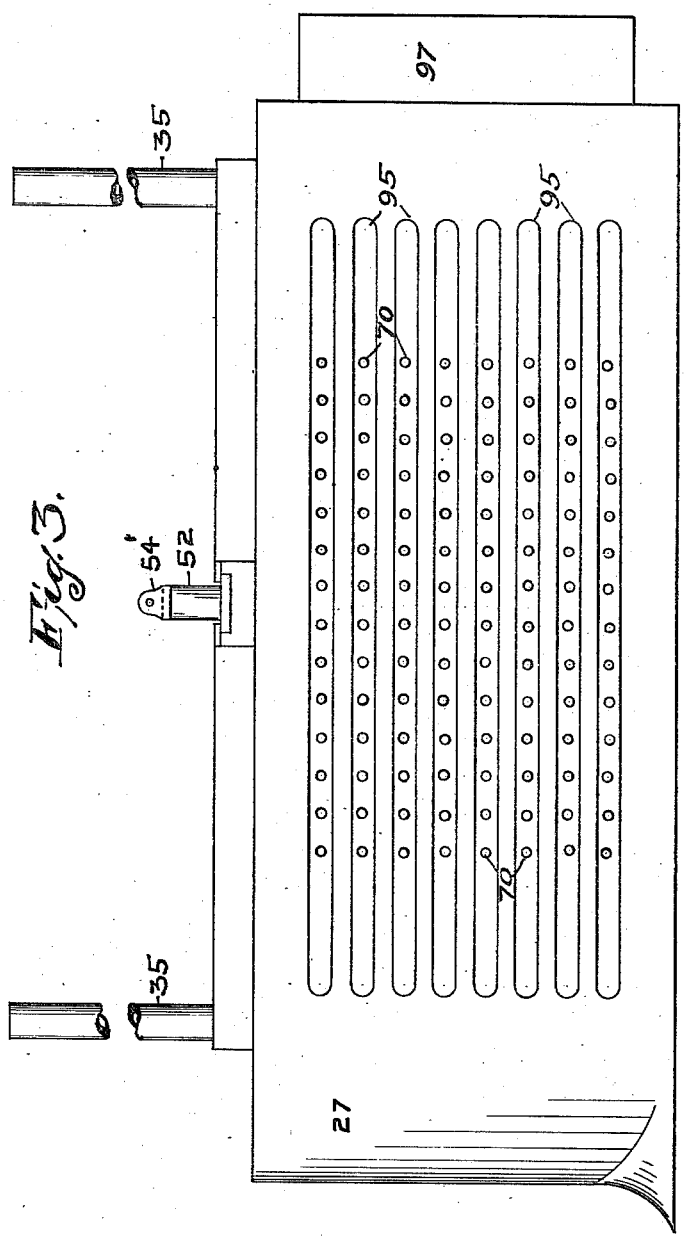

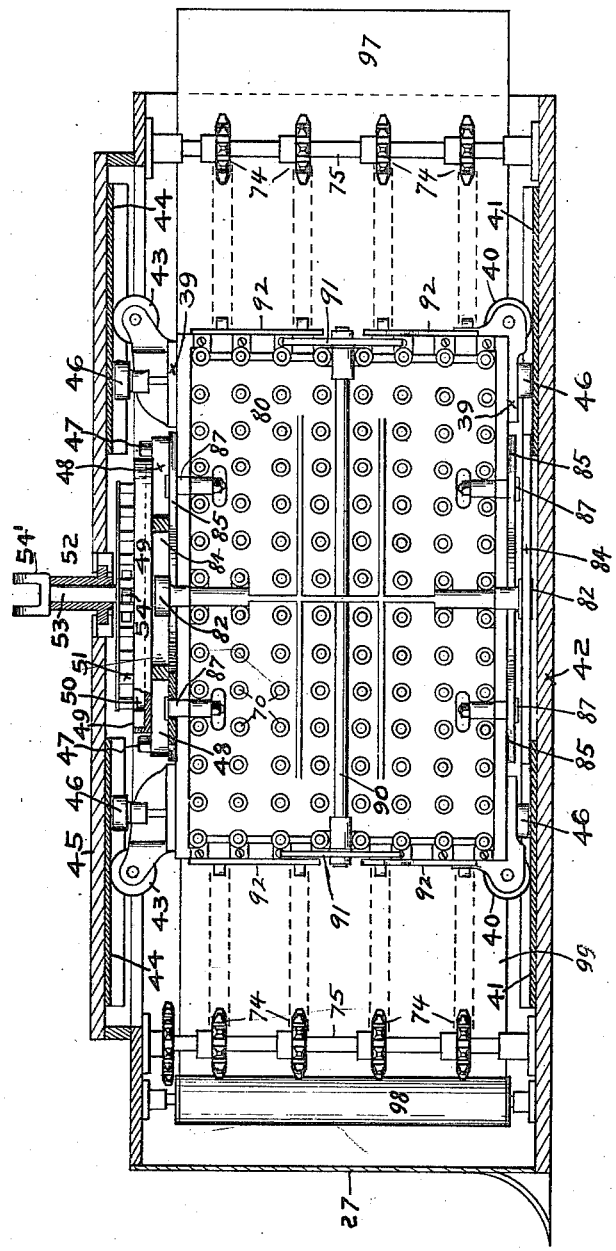

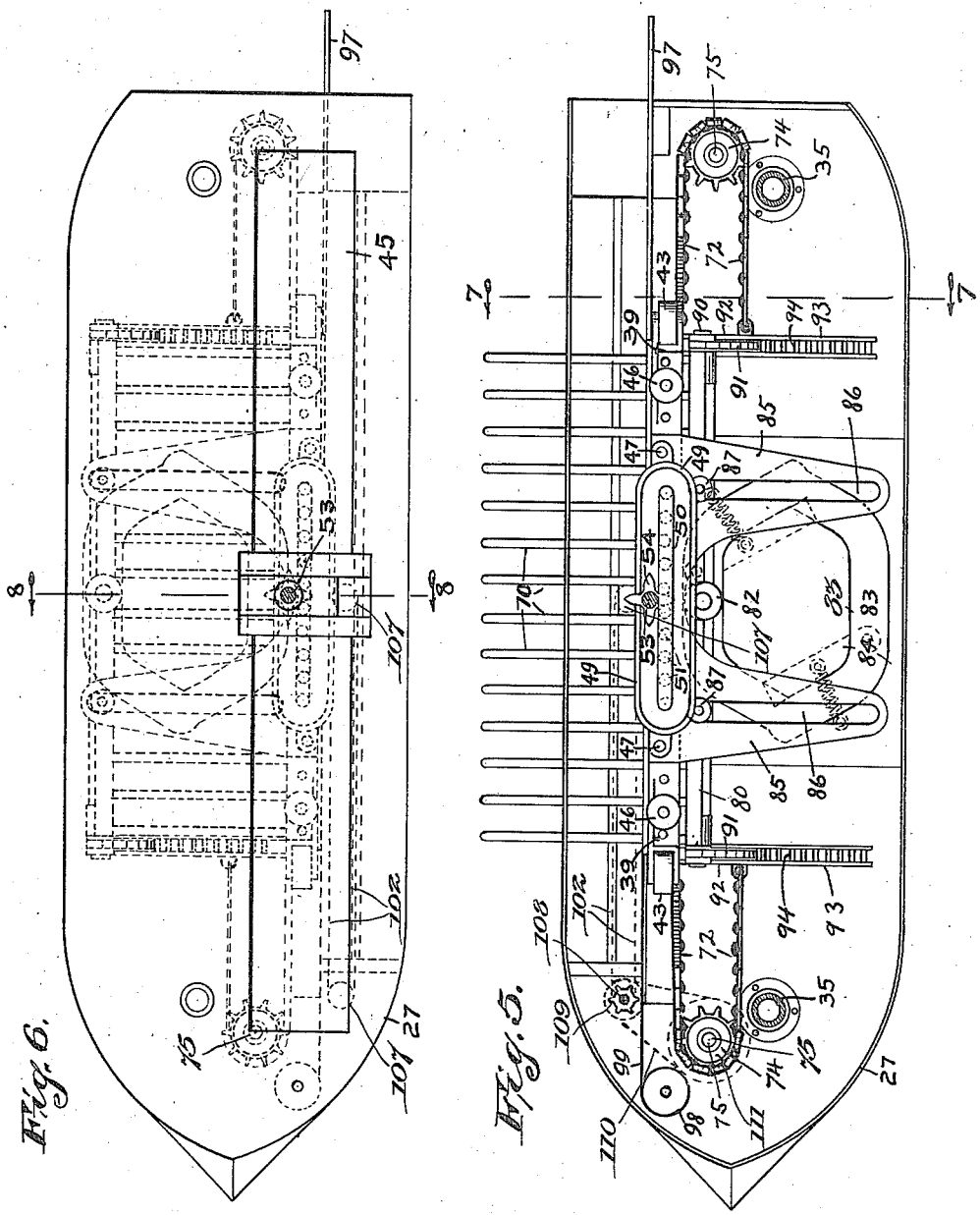

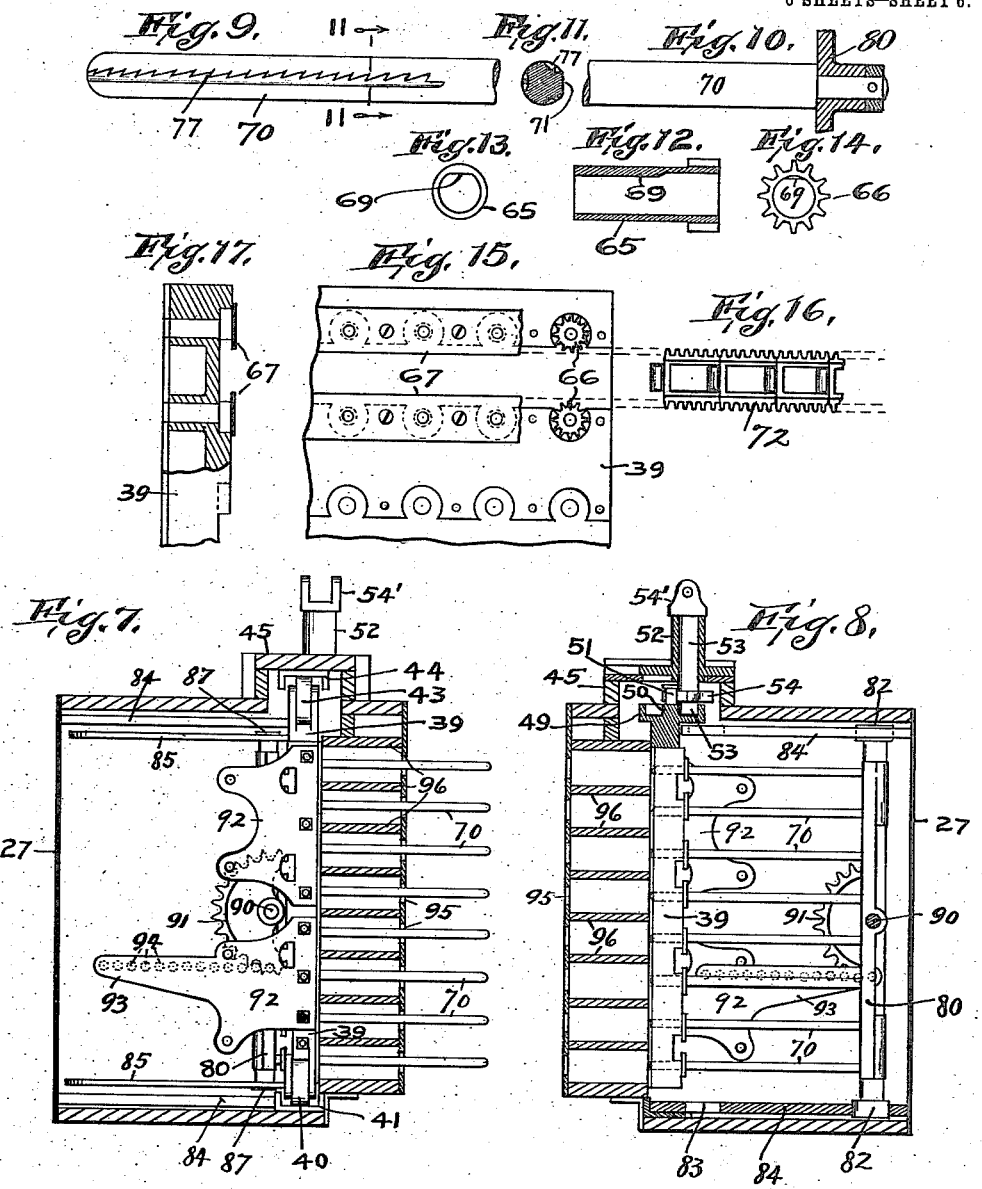

THOMAS J. GRAY, OF INDIANAPOLIS, INDIANA, ASSIGNOR OF THREE-FOURTHS TO CHARLES A. BOOKWALTER AND THOMAS TAGGART, OF INDIANAPOLIS, INDIANA, CRAWFORD FAIRBANKS, OF TERRE HAUTE, INDIANA, AND RALPH G. HEMINGRAY, OF MUNCIE, INDIANA.

MACHINE FOR PICKING COTTON.

999,714.   Specification of Letters Patent.   Patented Aug. 1, 1911.

Application filed November 4, 1909. Serial No. 526,234.

*To all whom it may concern:*

Be it known that I, THOMAS J. GRAY, a citizen of the United States, residing at Indianapolis, in the county of Marion and State of Indiana, have invented certain new and useful Improvements in Machines for Picking Cotton, of which the following is a specification.

This invention relates to machines for picking cotton from the plants in the field, and the object of the invention is to provide a machine having a plurality of barbed fingers which are introduced into the cotton-bearing plant at such near positions to each other as to practically contact with all of the open bolls, and to cause engagement of the cotton with the barbs on the fingers by a rapid rotation of said fingers.

Another object of the invention is to provide a reciprocating carriage to contain said rotary fingers, which will have a forward and rearward movement, the rearward movement being exactly compensated by the forward travel of the machine across the field whereby, when the fingers are extended into the plants, they will not be advanced by the forward travel of the machine until after they have been withdrawn from the plants.

My invention consists in the peculiar and novel mechanism for rotating the picker-fingers; the peculiar and novel construction for actuating the reciprocating carriage; the peculiar and novel construction for imparting a longitudinal movement to the picker-fingers, and in the general construction and arrangement of the machine, all as hereinafter described and claimed.

In order that my invention may be fully understood, I will describe it with reference to the accompanying drawings, in which—

Figure 1 is a view in side elevation of my complete machine. Fig. 2 is a plan view of same. Fig. 3 is a view in side elevation of a housing for the picker-fingers, showing the face which is presented to the plants. Fig. 4 is a view in longitudinal section of the casing or outer shell of said housing, showing the interior mechanism in elevation. Fig. 5 is a plan view of the housing on the near or left side of the machine and cotton row with the top removed and showing the picker-fingers extended. Fig. 6 is a plan view of the housing on the opposite or right side of the machine and cotton row showing the picker-fingers and associated mechanism in dotted lines in the position of said fingers when their reciprocating carriage is at the middle of its forward travel. Fig. 7 is a vertical section taken on the line 7—7 of Fig. 5. Fig. 8 is a vertical section taken on the line 8—8 of Fig. 6. Fig. 9 is a view on a larger scale of the outer or barbed end of one of the picker-fingers. Fig. 10 is a like view of the opposite or inner end of the finger, showing the end collar in section. Fig. 11 is a cross-section of the finger on the line 11—11 of Fig. 9. Fig. 12 is a longitudinal section of a sleeve-gear in which the picker-finger is slidingly mounted. Fig. 13 is a view of the front end and Fig. 14 a view of the opposite or rear end of said sleeve-gear. Fig. 15 is a view on a larger scale, in elevation, showing a portion of the reciprocating carriage which carries the picker-fingers. Fig. 16 is a detail in side elevation of the flexible reciprocating rock, and Fig. 17 is a detail in partial vertical section of the reciprocating carriage.

Like characters of reference indicate like parts throughout the several views of the drawings.

20 represents the main frame or body of my machine which will be mounted upon the front steering wheels 21 and the rear traction wheels 22. Secured to the wheels 22, or to the rear axle on which the wheels 22 will be mounted in a fixed manner, are the sprocket wheels 23, and from these sprocket wheels, by means of link belts 24, the power required to drive the picking mechanism will be transmitted to sprocket-wheels 25 on the ends of a transverse shaft 26 suitably mounted upon the frame 20. The sprocket wheels 25 are loosely mounted on their shaft 26 and their hubs are provided with half-clutches which engage with half-clutches mounted in a fixed manner on the shaft whereby any differences in travel between the two driving wheels due to uneven ground, will be equalized. While the mechanism just described is the best that I now know of for cotton-picking machines moved by animal power, it is obvious that the picking mechanism may be driven from a suitable motor mounted on the machine and also that the travel of the machine itself may be from power furnished by a motor carried by the machine, and I therefore do not desire to limit my invention to the exact mechanism here shown and described.

The frame 20 will preferably include two longitudinal beams forming the sides of the frame, and from each of these beams a housing 27 will be suspended by means of chains 28, which will be wound upon suitable drums (not shown) mounted on transverse shafts 29 and 30. The shafts 29 and 30 have suitable sprocket-wheels which are connected by a chain-belt 31, whereby, when the shaft 29 is rotated to wind or unwind its chains 28, the opposite shaft 30 will be correspondingly rotated to wind or unwind its chains 28. The shaft 29 will have a worm-wheel 34 which will be engaged by a worm 32 mounted on a shaft which also carries a hand-wheel 33, by the manipulation of which the shafts 29 and 30 may be simultaneously rotated to equally raise or lower both ends of the two housings 27. Vertical shafts 35 mounted in each end of the housings, extend up through guides in the main frame of the machine and serve to direct and maintain the proper vertical adjustments of the housings.

My machine as illustrated is intended to straddle a cotton row and to pick the cotton from both sides of the row at one movement of the machine along said row, and for this reason duplicate picking mechanism in two separate housings are employed. As the only difference between the picking mechanism in the two housings is that they are in reverse, that is that they are rights and lefts, it will only be necessary to describe the construction and operation of one of them, it being understood that the mechanism for the other side of the machine which does the picking is the same with the exception that it is reversed.

Referring now particularly to Figs. 4, 5, 7 and 8, a reciprocating carriage 39 is shown as mounted within the housing 27. It rests upon the rollers 40 having their travel in channel-bars 41 secured upon the bottom 42 of said housing. Similar rollers 43 carried by the upper corners of the carriage have a like travel in tracks formed by inverted channel-bars 44 secured to the top 45 of the housing, and lateral displacement of the carriage is prevented by the horizontal thrust-rollers 46, at top and bottom of the carriage working between the flanges of the channel-bars 41 and 44 respectively. Secured to the top of the carriage 39, by means of the bolts 47, is a metal base 48 which supports an integral horizontal plate with half-round ends (see Fig. 5), which plate has an integral vertical continuous marginal flange 49 and a longitudinal central flange 50 which supports a longitudinal rack 51. The top 45 of the housing has an opening in which a movable bearing sleeve 52 is mounted and in this sleeve is a shaft 53 which carries a pinion 54 the teeth of which engage the teeth of the rack 51. The shaft 53 is connected by a universal joint 54' (see Fig. 1), with a vertical shaft $54^2$. The shaft $54^2$ is supported by a yoke 55 swiveled on a jointed sleeve 56 supported by the standard 57. Mounted in the sleeve 56 is a shaft 58 which has a bevel-wheel 59 meshing with a pinion 60 mounted on the shaft $54^2$. The pinion 60 is splined to the shaft in a manner to permit the shaft to slide longitudinally through it for reasons which will presently appear. Mounted on the opposite end of shaft 58 is a bevel-pinion 62 which meshes with a bevel-wheel 63 on shaft 26.

By the above mechanism a continuous rotary motion is transmitted to the pinion 54, which by its engagement with the rack 51 causes the rack and thereby the carriage 39 to which the rack is fastened, to travel longitudinally of the housing 27. When an end of the rack 51 reaches the pinion 54 the rotation of the latter moves the pinion to the opposite side of the rack, and thereupon the rack and its carriage 39 are made to travel, by the continued rotation of the pinion 54, in an opposite direction. This reverse in the direction of travel of the rack and its carriage occurs each time that either end of the rack reaches said pinion 54. A reciprocating travel is thus imparted to the carriage 39, and as the rack and its carriage have no lateral movement the shaft 53 on which the pinion 54 is mounted must oscillate to allow the pinion to change from one side of the rack to the other. Hence I provide the universal joint between shafts 53 and $54^2$, and provide for a longitudinal sliding adjustment of shaft $54^2$ in the swiveled yoke 55.

Formed transversely through the body of the reciprocating carriage 39, are a plurality of cylindrical bores (see Figs. 4, 15 and 17) arranged in a series of horizontal and vertical rows, as shown in Fig. 4, in which will be mounted the elongated hubs 65 of sleeve-gears 66. The gear-wheels 66 will be set in below the face of the carriage and will be there retained by vertical plates 67. Passing through the sleeves or hollow hubs 65 are the cylindrical picker-fingers 70 which are longitudinally flattened at 71 to conform to an entering portion 69 of the hub 65, whereby the fingers will be rotated but may also be longitudinally reciprocated. The rotation of the gear-wheels 66, and through them of the picker-fingers 70, is accomplished by the flexible racks 72, which pass between adjacent horizontal rows of wheels 66 and have teeth or cogs on their upper and lower edges which engage with the cogs of said wheels 66. The racks 72 are comprised of a plurality of sections or links hinged together, and the ends of the flexible rack thus formed are fastened to brackets 92 at the opposite ends of the reciprocating carriage, as best shown in Fig. 5. The flexible racks pass around idle sprocket wheels 74 on vertical shafts 75 located at each end of the travel of said carriage. By this manner of using flexible racks I am able to rotate the fingers more rapidly than could be done with rigid racks, because, with a rigid rack the motion imparted to the fingers would be that caused by the travel of the carriage, while with a flexible rack as here shown, the rotation due to the travel of the carriage is accelerated by an accompanying travel of the rack itself in an opposite direction.

The picker-fingers are barbed below their outer or cylindrical surfaces as shown at 77, so as not to injure the unopened cotton bolls or the growing plant, when the fingers are thrust out into same, but so as to engage the cotton and pick it by wrapping it around the rotating fingers at the forward travel of the reciprocating carriage and to release the cotton by the opposite rotation of the fingers on the reverse travel of the carriage. I will not describe the mechanism by which the fingers are longitudinally reciprocated.

80 is a laterally movable plate which is to be maintained in constant parallelism with the carriage 39. It has suitable transverse openings in which the reduced ends (see Fig. 10) of the respective picker-fingers 70 are journaled, whereby, by the lateral movement of plate 80 the entire assignment of fingers in its housing will be moved in or out, depending on the direction of movement of said plate. Also, because of fingers 70, the plate 80 is compelled to travel to and fro with the reciprocation of carriage 39.

Mounted on vertical shafts above and below the plate 80 and midway of its length, are friction wheels 82, which enter cam-slots 83 in fixed horizontal plates 84. The plates 84 are supported by the walls of the housing, as shown in Fig. 8, so as to remain immovable while the carriage 39 and plate 80 move, and the cam-slot 83 in said plates 84 are so shaped as shown in Figs. 5 and 6, as to cause the friction-wheels 82 to alternately recede from and then approach toward the carriage 39 simultaneously, carrying the plate 80 in and out with them, which movement of the plate 80 will of course correspondingly move its attached fingers 70 in a longitudinal direction. The dotted lines in Fig. 5, show means to insure the continuous travel of the carriage in its orbit.

The reciprocating carriage 39 carries a pair of horizontal guide-plates 85 at its top and bottom, each of which has a straight slot 86 extending at right angles to the longitudinal dimensions of the carriage to receive rollers 87 journaled to the plate 80. The rollers 87 moving in these lateral slots 86 help to guide the plate 80 in its lateral travel, and as an additional safe-guard to insure constant parallelism between plate 80 and carriage 39, a condition necessary to keep the fingers from binding, I provide a horizontal shaft 90 mounted in suitable journals on the back of the plate 80 and parallel with it, on the ends of which are the segmental gears 91. The lower brackets 92, to which the ends of the segmental racks 72 are fastened, are provided with extensions 93, in duplicate vertical pairs, as shown in Fig. 5, which support horizontal pins forming a rack 94 to engage the teeth of the segmental gears 91. This insures that both ends of the plate 80 travel uniformly and equally in moving from or toward the carriage 39.

The inner vertical face of the housing 27 will have longitudinal slots 95 for the free passage of the picker-fingers 70 and their lateral travel, and horizontal floors 96 will be provided between the carriage 39 and this inner wall of the housing to receive the cotton which is discharged by a reverse rotation of the fingers as they are withdrawn from the cotton-bearing plants.

A floor 96 under each horizontal set of fingers is absolutely necessary to carry the cotton as it is liberated from the fingers back to the elevator and to prevent it from falling by gravity from the upper row down to the rows below and becoming massed and bunched as it would do without these separating platforms. If allowed to become bunched as would necessarily be the case without said platforms to support and separate the several deliveries the machine would soon become clogged and inoperative.

To keep the cotton, which has been discharged in a loose condition upon the floors 96, from discharging into the path of the carriage 39, I provide a partition-plate 97 which is attached rigidly to the rear end of the carriage and slides longitudinally, in and out of the housing with the carriage. But as there is not room enough at the front end of the housing for a rigid traveling partition-plate I provide a roller 98 and a canvas curtain 99, one end of which is attached to and is wound on and off of the roller, and the other end of which curtain is fastened to the front end of the carriage 39 by any suitable means (not shown).

The above described mechanism is so timed that the forward travel of the housing 27,—that is, of the machine across the field— is exactly equal to the rear or backward travel of the carriage 39, so that, while the machine is advancing, the position of its carriage with relation to the plants to be relieved of their cotton, remains unchanged, and the picker-fingers when thrust into the plants engage the cotton of the open bolls by the rotation of their barbed surfaces and remove and discharge it upon the horizontal floors 96 within the housing, without injuring the cotton plants in any way. The shape of the cam-slots 83 is such that the rear picker-fingers will be introduced into the plants at each new insertion at a distance in advance of the previous position of the front row of pickers equal to the distance apart of the vertical picker-rows. The picker-fingers of each housing extend half way through a plant row, and it therefore requires the joint action of the fingers of the two housings to pick both sides of a row at once. As the cotton is discharged from the fingers into the housings 27 it is moved by any suitable means along the floors 96 to the rear where it is elevated by a belt carrier through a chute 100 (see Figs. 1 and 2), and is discharged into any suitable receptacle 101.

The means which I have here shown for moving the cotton along the floors 96, are belts 102 (shown in dotted lines in Figs. 5 and 6) passing around suitable pulleys 107. Shafts 108 on which the front ones of said pulleys are mounted are also provided with sprocket wheels 109 which are connected by chain belts 110 with sprocket wheels 111 on shafts 75.

Having thus fully described my invention, what I claim is new and wish to secure by Letters Patent of the United States, is—

1. A machine adapted to be progressively moved at a uniform speed along a row of cotton-bearing plants, a carriage mounted on the machine having a reciprocating travel parallel with the cotton row, means for moving the carriage at the same speed as the machine, fingers carried by the carriage, means for moving the fingers longitudinally into the row of plants during one period of travel of the carriage and for withdrawing them during the other period of travel of the carriage comprising horizontal fixed plates having cam-slots, and a vertical plate in which the ends of the fingers are mounted, said vertical plate having rollers entering the cam-slots of the horizontal plates, horizontal slotted guide plates, and rollers on said vertical plate entering the slots of the guide plates.

2. A machine adapted to be progressively moved at a uniform speed along a row of cotton-bearing plants, a carriage mounted on the machine having a reciprocating travel parallel with the cotton row, brackets secured to the carriage adjacent each of its ends and extending laterally of the carriage on the opposite side from the cotton row, said brackets supporting horizontal racks, fingers carried by the carriage, means for moving the fingers longitudinally into the row of plants during one period of travel of the carriage and for withdrawing them during the other period of travel of the carriage comprising horizontal fixed plates having cam-slots, a vertical plate in which the ends of the fingers are mounted, rollers on said vertical plate entering the cam-slots of the horizontal plates, a horizontal shaft mounted on said vertical plate and segmental gears on said horizontal shaft engaging the said racks on the carriage-brackets.

3. A machine adapted to be progressively moved at a uniform speed along a row of cotton-bearing plants, a carriage mounted on the machine having a reciprocating travel parallel with the cotton row, horizontal plates projecting laterally from the carriage on the opposite side from the cotton row said plates having straight slots at right angles to the carriage, fingers carried by the carriage, horizontal fixed plates having cam-slots, a vertical plate in which the ends of the fingers are mounted, rollers secured to said vertical plate and entering the cam-slots of the horizontal plates, other rollers secured to the vertical plate and entering the straight slots of said first plates and means for rotating the fingers.

4. A machine adapted to be progressively moved at a uniform speed along a row of cotton-bearing plants, a carriage mounted on the machine having a reciprocating travel parallel with the cotton row, brackets fastened to the carriage near its ends and projecting laterally on the opposite side from the cotton row said brackets carrying horizontal racks, horizontal plates carried by the carriage and projecting laterally therefrom on the opposite side of the carriage from the cotton row said horizontal plates having straight slots at right angles to the carriage, means for moving the carriage at the same speed as the machine, fingers carried by the carriage, horizontal fixed plates having cam-slots, a vertical plate in which the ends of the fingers are mounted, rollers carried by said vertical plate entering the cam-slots of the fixed horizontal plates, other rollers carried by the vertical plate entering the slots at right angles to the carriage, a shaft carried by said vertical plate and segmental gears on the ends of said shaft engaging the horizontal racks of said brackets.

5. A machine adapted to be progressively moved at a uniform speed along a row of cotton-bearing plants, said machine having tracks parallel with the direction of its travel, a carriage mounted on rollers which follow said tracks, a horizontal rack extending longitudinally of the carriage and surrounded by an oval channel, a swingingly mounted revoluble pinion located in said channel in engagement with the rack, fingers carried by the carriage, means for rotating the fingers and means for longitudinally reciprocating them at predetermined periods.

6. A machine adapted to be progressively moved at a uniform speed along a row of cotton-bearing plants, tracks parallel with the cotton row carried by said machine, a reciprocating carriage mounted on said tracks, a rack parallel with the cotton row carried by the carriage, a vertical flange passing around all of the sides and ends of the rack and separated therefrom by a channel, a shaft swingingly supported above the rack, a pinion on the shaft engaging the rack, means for driving the shaft, fingers carried by the carriage, means for rotating the fingers and means for longitudinally reciprocating them at predetermined periods.

7. A machine adapted to be progressively moved at a uniform speed along a row of cotton-bearing plants, tracks parallel with the cotton row carried by said machine, a carriage mounted on said tracks, a rack parallel with the cotton row carried by the carriage, a continuous flange passing completely around the rack and separated therefrom by a channel, a shaft swingingly supported above the rack, a pinion on the shaft engaging the rack, means for driving the shaft, fingers carried by the carriage, means actuated by the travel of the carriage for rotating the fingers, and other means also actuated by the travel of the carriage, for longitudinally reciprocating the fingers at predetermined periods.

8. A machine adapted to be progressively moved at a uniform speed along a row of cotton-bearing plants, tracks parallel with the cotton row carried by said machine, a carriage mounted on said tracks, a rack parallel with the cotton row carried by the carriage, a flange passing around all of the sides and ends of the rack and separated therefrom by a channel, a shaft swingingly supported above the rack, a pinion on the shaft engaging the rack, means for driving the shaft, pinions mounted in horizontal rows in the carriage, racks parallel with the direction of travel of the carriage engaging said pinions so as to rotate them by the travel of the carriage, fingers slidingly mounted in said pinions and means for longitudinally reciprocating the fingers at predetermined periods.

9. A machine mounted on wheels and adapted to be progressively moved at a uniform speed along a row of cotton-bearing plants, tracks parallel with the cotton row carried by said machine, a carriage mounted on said tracks, a rack parallel with the cotton row carried by the carriage, an oval flange passing continuously around the rack and separated therefrom by channels, a shaft swingingly supported above the rack, a pinion on the shaft engaging the rack, means connected with said wheels of the machine for driving the shaft at a uniform rate with the travel of the machine, pinions having hollow sleeves mounted in horizontal rows in the carriage, vertical shafts at the ends of the travel of the carriage, sprocket-wheels loosely mounted thereon, flexible racks engaging said rows of pinions and passing around the said sprocket-wheels and having their ends attached to the respective ends of the carriage, fingers slidingly mounted in the hollow sleeves of the pinions, and means for longitudinally reciprocating the fingers at predetermined periods.

10. In a machine for picking cotton from plants, a reciprocating carriage, a plurality of pinions having hollow sleeves mounted in horizontal rows on the carriage, a vertical shaft at each end of the travel of the carriage, sprocket-wheels loosely mounted on said shaft, flexible racks engaging said horizontal rows of pinions said racks being comprised of a plurality of hingedly connected links which pass between the rows of pinions and thence around corresponding sprocket-wheels at the ends of travel of the carriage, the ends of the flexible racks being fastened to the respective ends of the carriage, fingers slidingly mounted in the hollow pinion sleeves, and means for longitudinally reciprocating the fingers at predetermined periods.

11. In a machine for picking cotton from plants, a reciprocating carriage, a plurality of pinions mounted in horizontal rows on the carriage, barbed fingers carried by said pinions, a vertical shaft at each end of the travel of the carriage, sprocket-wheels loosely mounted on said shaft, and flexible racks engaging said horizontal rows of pinions said racks being comprised of a plurality of hingedly-connected links which pass between the rows of pinions and thence around corresponding sprocket-wheels at the ends of the travel of the carriage, the ends of the flexible racks being fastened to respective ends of the carriage.

12. In a machine for picking cotton from plants, a reciprocating carriage, a plurality of barbed fingers mounted in the carriage in a series of horizontal rows, a spur gear-wheel mounted on each finger, and flexible racks passing between the rows of fingers and drivingly engaging the gear-wheels, and means for moving the racks in an opposite direction to the carriage movement.

13. In a machine for picking cotton from the plant, a housing adapted to travel between the cotton-rows, a carriage having reciprocating movement within the housing in a direction parallel with the cotton rows, picking-fingers carried by the carriage and arranged in a series of horizontal rows and adapted to be projected through a side of the housing into the cotton plants and to withdraw into the housing and to discharge the cotton picked by them, and a horizontal floor under each row of picking-fingers and between the carriage and the adjacent wall of the housing to keep the cotton from the several rows of fingers separate and from bunching together after being discharged from the fingers.

14. In a machine for picking cotton from plants, a frame mounted on wheels and adapted to straddle a cotton row, a pair of housings adjustably suspended from said frame one of said housings being on each side of a cotton row, a plurality of picking-fingers mounted in each housing, means for rotating said fingers, and means for reciprocating the fingers of both housings longitudinally first into the cotton-bearing plants of the row and then back again into the housing, and means for timing the reciprocating movement of said fingers with the forward travel of the machine to cause all of the plants of the row to be equally reached by said fingers.

15. In a machine for picking cotton from plants, a housing, a carriage having a reciprocating movement within the housing longitudinally of the latter, picking-fingers carried by said carriage, and a partition-plate attached to the rear end of the carriage and moving with the latter to keep the picked cotton from discharging into the path of the carriage.

16. In a machine for picking cotton from plants, a housing, a carriage within the housing having a reciprocating movement longitudinally thereof, picking-fingers carried by the carriage and adapted to remove the cotton from the plants and discharge it within the housing, a vertical apron-roller at the forward end of the travel of the carriage and a flexible apron having one end attached to the roller whereby the apron may be wound thereon, and having its other end attached to the carriage.

17. In a machine for picking cotton from the plant, a housing adapted to travel between the cotton rows, a carriage having reciprocating movement within the housing in a direction parallel with the cotton rows, picking-fingers carried by the carriage and arranged in a series of horizontal rows and adapted to be projected through a side of the housing into the cotton plants and to withdraw into the housing and to discharge the cotton picked by them, a horizontal floor under each row of picking-fingers to keep the cotton in the several rows of fingers separate and from bunching together after being discharged from the fingers, and means for positively moving the cotton from front to rear on said platform.

18. In a machine for picking cotton from the plant, a housing adapted to travel between the cotton rows, a carriage having reciprocating movement within the housing in a direction parallel with the cotton rows, picking-fingers carried by the carriage and arranged in a series of horizontal rows and adapted to be projected through a side of the housing into the cotton plants and to withdraw into the housing and to discharge the cotton picked by them, a horizontal floor under each row of picking-fingers to keep the cotton in the several rows of fingers separate and from bunching together after being discharged from the fingers, and means comprising a carrier belt for positively moving the cotton from front to rear on said platform.

In witness whereof, I have hereunto set my hand and seal at Indianapolis, Indiana, this 25th day of October, A. D. one thousand nine hundred and nine.

THOMAS J. GRAY. [L. S.]

Witnesses:
F. W. WOERNER,
J. A. MINTURN.